United States Patent
Nelson et al.

(10) Patent No.: US 6,244,107 B1
(45) Date of Patent: *Jun. 12, 2001

(54) PUSH-ON BRACKET

(75) Inventors: Steve D. Nelson, Bradenton; Richard K. Anderson; Jack T. Sossamon, both of Sarasota, all of FL (US)

(73) Assignee: Teleflex, Incorporated, Plymouth Meeting, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/334,161

(22) Filed: Jun. 16, 1999

(51) Int. Cl.[7] ........................................... G12B 9/04
(52) U.S. Cl. ............................................... 73/431; 248/27.1
(58) Field of Search .................................. 73/431, 866.5; 248/27.1, 27.3, 904

(56) References Cited

U.S. PATENT DOCUMENTS

| 3,871,606 | * | 3/1975 | Larson et al. .................. 248/27.1 |
| 3,881,201 | | 5/1975 | Richards ......................... 4/286 |
| 4,086,483 | | 4/1978 | Freund et al. ................... 362/311 |
| 4,453,059 | | 6/1984 | Fukushima ....................... 200/296 |
| 4,527,048 | | 7/1985 | Comerford et al. ............... 219/269 |
| 5,440,468 | * | 8/1995 | Savage, Jr. ...................... 248/27.3 |

FOREIGN PATENT DOCUMENTS

996330 * 6/1965 (GB) .................................. 248/27.1

* cited by examiner

Primary Examiner—Robert Raevis
(74) Attorney, Agent, or Firm—Howard & Howard

(57) ABSTRACT

A gauge mounting assembly (10) for mounting a gauge (12) to a vehicle instrument panel (18) includes a gauge (12) disposed within an annular gauge housing (14) and an annular gauge bracket (16) for securing the gauge (12) to the instrument panel (18). The gauge bracket (16) includes ratcheting surfaces (22) for retaining the housing (14) to the bracket (16) in any one of various positions. The ratcheting surfaces (22) are disposed upon flexible tabs (24) extending from the bracket (16). The gauge housing (14) includes a plurality of annular and parallel ribs (26) for engaging the ratcheting surfaces (22) on the tabs (24).

7 Claims, 2 Drawing Sheets

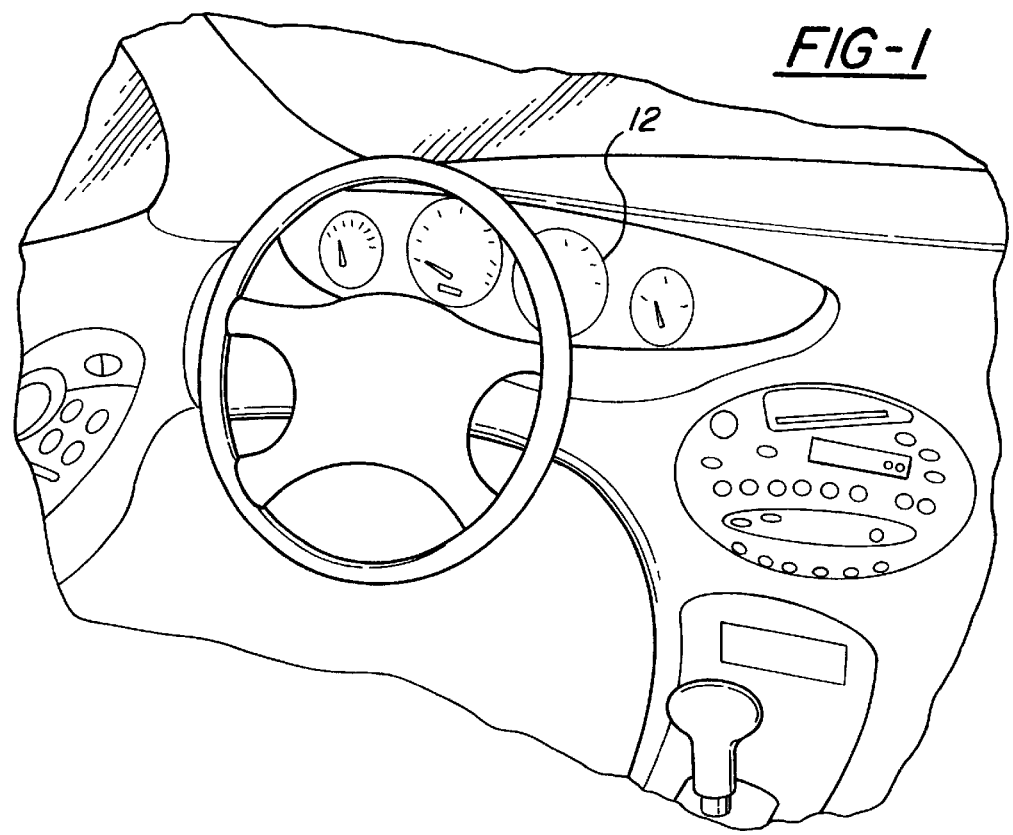
FIG-1
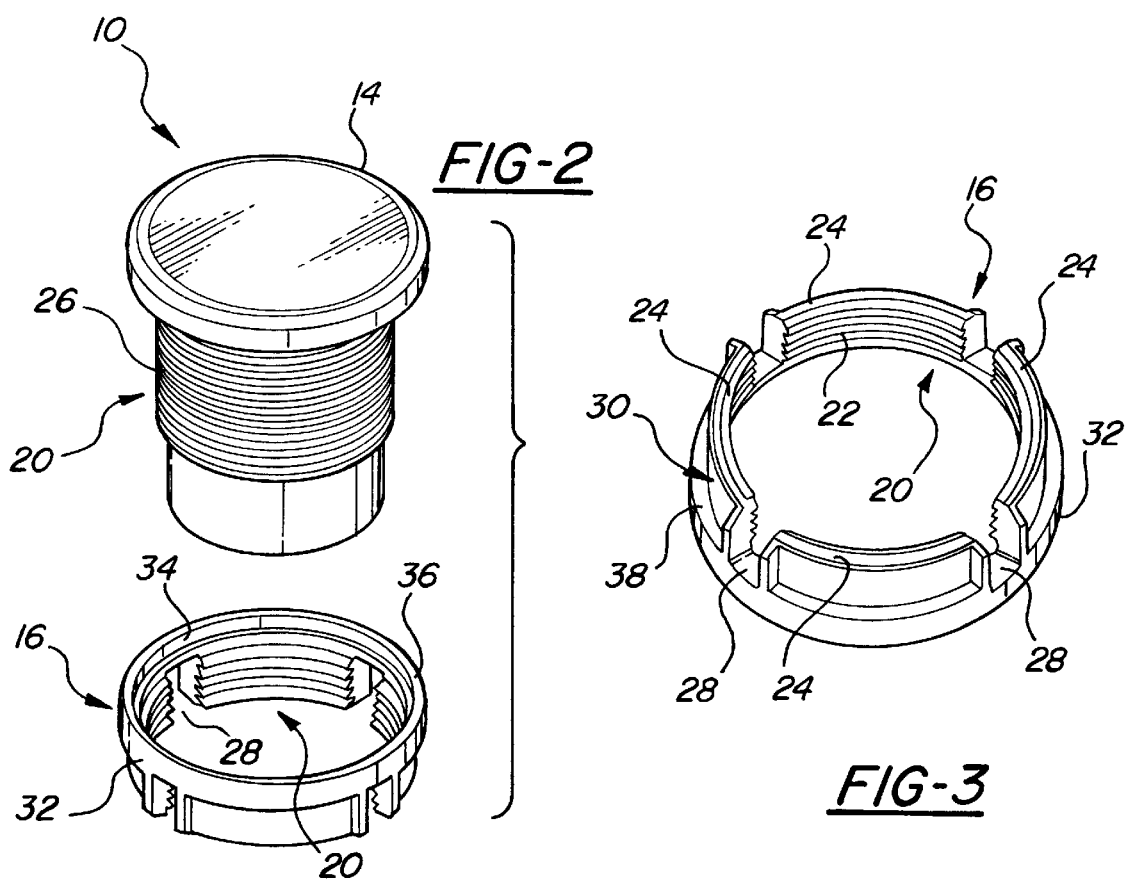
FIG-2
FIG-3

PUSH-ON BRACKET

BACKGROUND OF THE INVENTION

1) Technical Field

The present invention relates to a gauge mounting assembly, and in particular to an improved method for mounting the assembly to an instrument panel.

2) Description of the Prior Art

A gauge mounting assembly provides the means for attaching a gauge to an instrument panel of a vehicle such as an automobile, a boat, or an airplane. A typical method for attachment requires a housing having a gauge disposed therein placed into an aperture in an instrument panel. A bracket is attached to the housing from the back side of the instrument panel sandwiching the instrument panel between the housing and the bracket. The housing typically has a screw thread on an outer wall onto which threads disposed on and inner wall of the bracket engage. The bracket is screwed onto the housing by an operator. To accommodate for variable instrument panel thicknesses, extended threading is required on the housing. This results in an ergonomically difficult operation for the assembler of applying circular force to the bracket for an extended period of time. In addition to the ergonomic difficulties, assembly time for the instrument panel is increased by the extended period of screwing the bracket onto the housing.

SUMMARY OF THE INVENTION AND ADVANTAGES

A gauge mounting assembly for mounting a gauge to a vehicle instrument panel includes a gauge disposed within an annular gauge housing and an annular gauge bracket for securing the gauge to the instrument panel. The assembly includes snap-together elements for snapping the housing into engagement with the bracket and for sandwiching the instrument panel between the housing and the bracket.

The snap together elements eliminated the need for screwing the bracket onto the housing as method of attachment. A snapping action is ergonomically desirable to a screwing action. In addition, a snapping action is quicker than a screwing action which reduces assembly time for the instrument panel.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of an instrument panel showing gauges;

FIG. 2 is an exploded view of the gauge mounting assembly;

FIG. 3 is a perspective view of the bracket;

DETAILED DESCRIPTION OF THE PREFERRED EMBODIMENT

Figure 4:
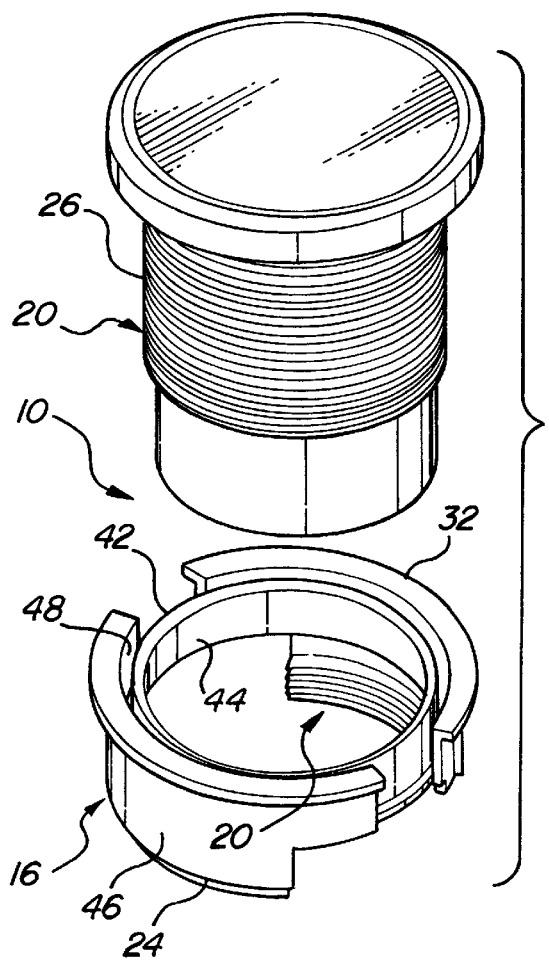
FIG. 4 is an exploded view of an alternate embodiment of the gauge mounting assembly.

Referring to the Figures, wherein like numerals indicate like or corresponding parts throughout the several views, a gauge mounting assembly for mounting a gauge to a vehicle instrument panel is generally shown at 10 including a gauge 12 disposed within an annular gauge housing 14, and an annular gauge bracket 16 for securing the gauge 12 to the instrument panel 18. The assembly 10 includes snap-together elements generally shown at 20 for snapping the housing 14 into engagement with the bracket 16 and for sandwiching the instrument panel 18 between the housing 14 and the bracket 16.

The snap together elements 20 include ratcheting surfaces 22 for retaining the housing 14 to the bracket 16 in any one of various positions. Thus, variable thicknesses of the instrument panel 18 can be accommodated when sandwiching the instrument panel 18 between the housing 14 and the bracket 16. The ratcheting surfaces 22 are contemplated to form buttress threads allowing the bracket 16 to be ratcheted onto the housing 14, but preventing the bracket 16 from being ratcheted off. The snap-together elements 20 include flexible tabs 24 extending from the bracket 16. The tabs 24 present the ratcheting surfaces 22 and the snap-together elements 20 include a plurality of annular and parallel ribs 26 on the housing 14 for engaging the ratcheting surfaces 22 on the tabs 24. The ribs 26 are contemplated to form a screw thread, the purpose of which is described hereinbelow.

The tabs 24 are separated by axially extending slots 28 for allowing the tabs 24 to expand radially outward as the ratcheting surfaces 22 ratchet over the ribs 26. The bracket 16 includes a cylindrical portion 30 and a radially extending flange 32. The slots 28 are disposed in the cylindrical portion 30. When assembled, the flange 32 is adjacent the instrument panel 18, and the cylindrical portion 30 extends away from the instrument panel 18.

The bracket 16 includes an inner conical surface 34 for interconnecting the cylindrical portion 30 and the flange 32. During assembly, the conical surface 34 guides the housing 14 into the bracket 16 for presenting the ribs 26 on the housing 14 to the ratcheting surfaces 22 on the tabs 24.

The flange 32 includes a forward surface 36 and a rearward surface 38. The rearward surface 38 includes fingers 40 for applying circular force. The fingers 40 are integral with the cylindrical portion 30 for providing stiffness to the tabs 24 for improving retention to the housing 14. In assembled position, the forward surface 36 of the flange 32 abuts the instrument panel 18 while the rearward surface 38 is accessible. The fingers 40 provide an assembler the ability to grip the bracket 16 for applying circular force. The ribs 26, which form a screw thread, engage the ratcheting surface 22, allowing the bracket 16, to be screwed further onto the housing 14 for additional tightening after the bracket 16 has been ratcheted onto the housing 14. By reversing the screwing motion the bracket 16 can be removed from the housing 14 for releasing the housing 14 from the instrument panel 18.

Figure 5:
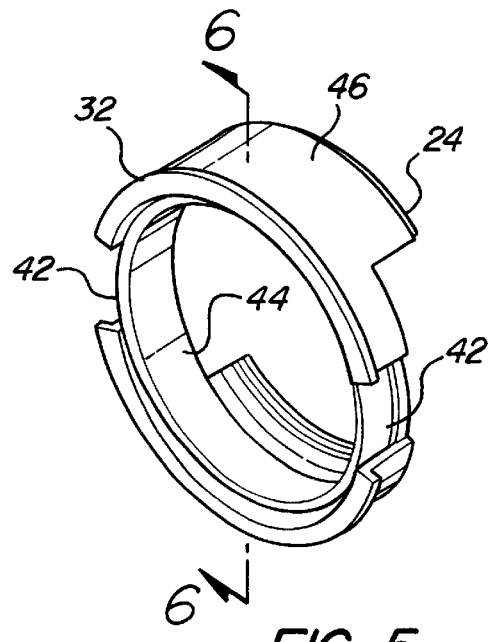
FIG. 5 is a perspective view of the alternate embodiment of the bracket.
Figure 7:
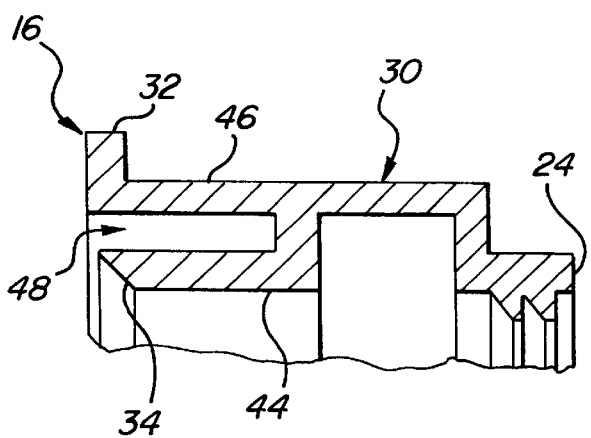
FIG. 7 is an expanded view of the alternate embodiment of the bracket as shown in FIG. 6.
Figure 6:
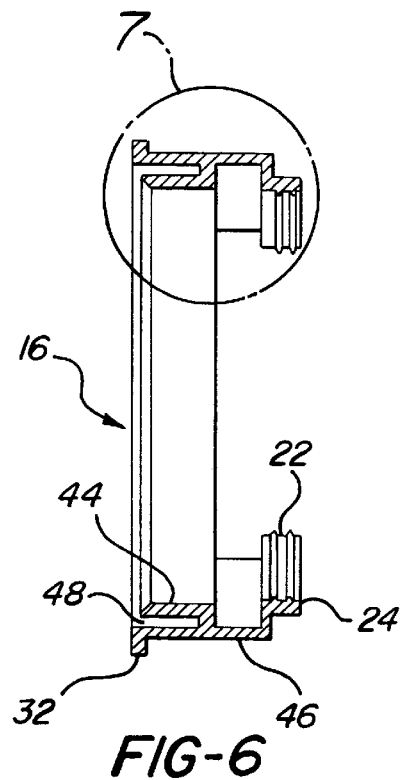
FIG. 6 is a sectional view of the alternate embodiment of the bracket through line 6—6 of Figures.

In an alternate embodiment, as shown in FIGS. 4 through 7, the bracket 16 includes a pair of gaps 42 to form opposed sections of the flange 32 which may be moved radially together to move the tabs 24 radially apart to disengage the ratcheting surfaces 22 from the ribs 26. The cylindrical portion 30 of the bracket 16 includes an inner wall 44 and an outer wall 46. The inner wall 44 forms a continuous wall 44 circumscribing the cylindrical portion 30. The walls 44,46 are spaced radially from one another and are attached by a connecting wall 47 to create an annular space 48. The gaps 42 extend axially in the outer wall 46. Disengaging the ratcheting surfaces 22 from the ribs 26 by depressing the flange 32 allows for the quick release of the bracket 16 from the housing 14. By depressing the flanges 32, the connecting wall 47 functions as a fulcrum allowing for the disengagement of the ratcheting surface 22 from the ribs. This eliminates the need to apply circular force upon the bracket 16 for removing the bracket 16 from the housing 14.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A gauge mounting assembly (10) for mounting a gauge (12) to a vehicle instrument panel (18), said assembly (10) comprising:

a gauge (12);

an annular gauge housing (14) having said gauge disposed therein;

an annular gauge bracket (16) for securing said gauge (12) to the instrument panel (18);

snap-together elements (20) disposed upon said housing (14) and said bracket (16) for snapping said housing (14) into engagement with said bracket (16) and for sandwiching the instrument panel (18) between said housing (14) and said bracket (16);

said snap together elements (20) including an annular rib (26) disposed upon said housing (14) forming a continuous thread; and said snap together elements (20) including flexible tabs (24) extending from said bracket (16) and being separated by axially extending slots (28) allowing said tabs (24) to expand radially outward each tab (24) including a ratcheting surface (22) for retaining said housing (14) to said bracket (16) in any one of various positions and said ratcheting surfaces (22) being pivotable upon said annular rib (26) for tightening and loosening said bracket (16).

2. An assembly (10) as set forth in claim 1 wherein said said ratcheting surfaces (22) define a plurality of parallel ribs for engaging said annular rib (26) disposed upon said housing (14).

3. An assembly (10) as set forth in claim 2 wherein said bracket (16) includes a cylindrical portion (30) and a radially extending flange (32), said slots (28) being disposed in said cylindrical portion (30).

4. An assembly (10) as set forth in claim 3 wherein said bracket (16) includes an inner conical surface (34) for interconnecting said cylindrical portion (30) and said flange (32).

5. An assembly (10) as set forth in claim 4 wherein said flange (32) includes a forward surface (36) and a rearward surface (38), said rearward surface (38) having fingers (40) for applying circular force.

6. An assembly (10) as set forth in claim 4 wherein said bracket (16) includes a pair of gaps (42) to form opposed sections of said flange (32) which may be moved radially together to move said tabs (24) radially apart to disengage said ratcheting surfaces (22) from said ribs (26).

7. An assembly (10) as set forth in claim 6 wherein said cylindrical portion (30) of said bracket (16) includes and inner wall (44) and an outer wall (46), said inner wall (44) and said outer wall (46) having an annular space (48) disposed therebetween.

\* \* \* \* \*